E. M. STEVENS,

Assignor, by mesne assignments, to J. H. CHEEVER.

Wash-Board.

No. 8,844. Reissued Aug. 12, 1879.

Witnesses

E. C. Dick

Wm. Thompson

Inventor

Edgar M. Stevens by A. Collot his attorney

UNITED STATES PATENT OFFICE.

EDGAR M. STEVENS, OF BOSTON, MASSACHUSETTS, ASSIGNOR, BY MESNE ASSIGNMENTS, TO JOHN H. CHEEVER.

IMPROVEMENT IN WASH-BOARDS.

Specification forming part of Letters Patent No. 73,404, dated January 14, 1868; Reissue No. 8,844, dated August 12, 1879; application filed March 25, 1879.

*To all whom it may concern:*

Be it known that I, EDGAR M. STEVENS, of Boston, in the county of Suffolk and State of Massachusetts, have made certain new and useful Improvements in Corrugated Rubber Sheets and Wash-Boards made therewith, of which the following is a full, clear, and exact description, reference being had to the drawings making part of this specification, in which—

Figure 1:
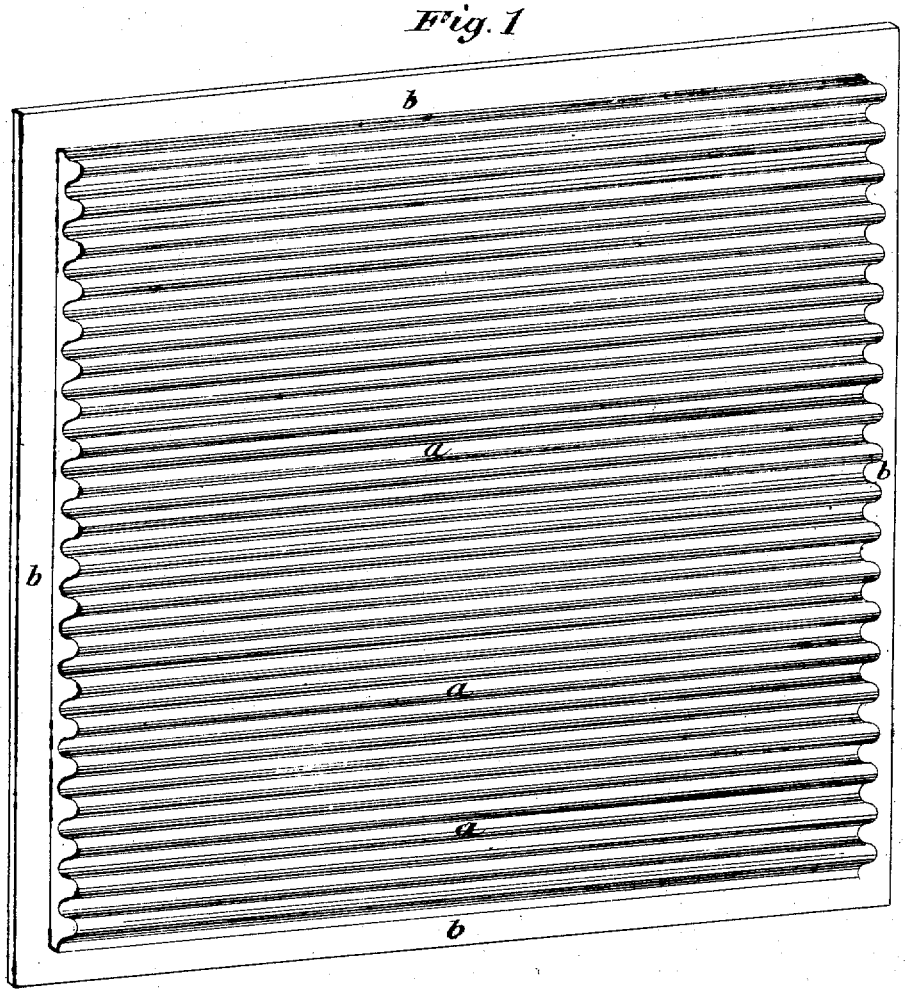
Figure 2:
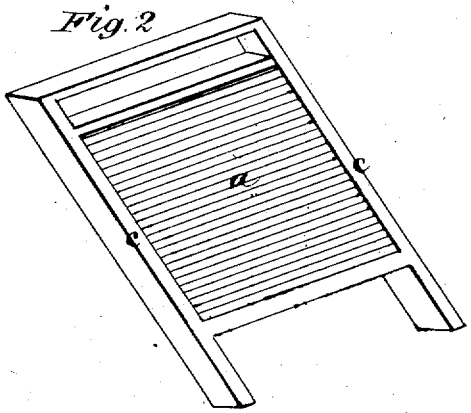
Figure 3:
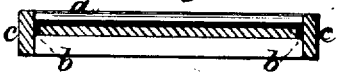

Figure 1 represents my invention in perspective, the same consisting of a plate or sheet of corrugated india-rubber. Fig. 2 is a view, on a reduced scale, of the same applied to a frame to form a wash-board; and Fig. 3 is a section of Fig. 2.

The object of my invention is to produce a sheet of suitable material with elevations and depressions upon its surface of such a character as to secure a certain flexibility and tenacity of frictional surface, and to withstand pressure and rubbing thereover. Such a sheet is well adapted for use as a wash-board face, being more efficient and durable than those made of metal and wood now in use.

The invention consists in the production of a plate or sheet of india-rubber, or its compounds, mixed with any suitable fibrous material, such as cotton or linen rags, the said sheet having corrugations on the face, which extend from side to side and are open at the ends, and being vulcanized; and, second, in combining such a sheet with a suitable frame, the whole forming a rubber-faced wash-board.

Wash-boards have heretofore been made of wood or metal, and attempts have been made to form them of ordinary vulcanized caoutchouc. The objection to those made of metal is, that the surface is liable to become bent or broken, and thus tear or injure the clothes. Those made of wood soon wear away, and in consequence of the great friction applied in washing the clothes, the alternate wetting and drying, the raised portions of the surface become broken and splintered, and the board soon becomes useless.

In carrying out my invention, any suitable compound of india-rubber is used, which, after being ground upon the ordinary heated rolls, is spread in a sheet or plate of any suitable or required thickness or size. It is then placed in a mold and vulcanized, the mold being of the form that shall give it the required corrugation.

Fig. 1 represents the plate or sheet as it leaves the mold, consisting of the corrugations *a a*, which may be angular or curved. These corrugations extend from side to side of the sheet, and are open at the ends, as shown.

In the drawings the corrugated sheet is shown provided with a plain border or space, *b*, on the sides thereof, for the purpose of attachment.

The ridges forming the corrugations, being widest at the base, and of a height corresponding to such width, as shown, are adapted, while retaining a certain flexibility and elasticity, to secure tenacity of frictional surface and to withstand pressure and rubbing.

The grooves or depressions between the ridges or elevations are conversely narrowest at the bottom, and are also open at their ends, whereby the same are capable of being readily cleaned from foreign matter, water, or dirt when the frame is removed.

In Fig. 2 this sheet is shown attached to a frame so as to form a wash-board, the attachment being effected by turning down the edges of the sheet, formed with a plain border, *b*, as represented in Fig. 3.

To secure the sheet firmly the edges are turned down on the sides and top and bottom.

The proportions of the compound which are preferred are as follows: eight pounds crude rubber, two pounds litharge, one pound white lead, one pound lamp-black, four pounds calcined plaster, and six ounces flowers of sulphur. To this are added, in about the proportion of one-fourth, ground rags or other suitable fibrous material. The whole, after being thoroughly ground upon the ordinary heated rollers, is placed in molds and vulcanized by exposure for ten hours, or thereabout, to a temperature of 275° Fahrenheit.

A wash-board made and formed as above described will possess a certain flexibility and tenacity of frictional surface, which, while it will not wear or injure the clothes, as in the case of the metal or wooden wash-boards, will have the property of erasing, as it were, all dirt or filth from the clothes, and thoroughly cleanse them in a very efficient and expeditious manner.

The ordinary india-rubber without the admixture of some fibrous material will not answer the purpose, as the severe friction and exposure to which it is subjected would soon wear it away and render it useless.

I do not confine myself to any particular compound, nor to any particular length of time for vulcanizing the same; but

What I claim as my invention, and desire to secure by Letters Patent, as an article of manufacture, is—

1. A corrugated plate or sheet of india-rubber mixed with fibrous material, shaped and vulcanized substantially as described, the corrugations being of the form shown, open at the ends, as set forth.

2. A wash-board composed of the corrugated sheet of india-rubber and fibrous material described, and secured in a frame, substantially as specified.

In testimony whereof I have hereunto signed my name this 19th day of March, A. D. 1879.

EDGAR M. STEVENS.

Witnesses:

CHARLES NEWHALL,
PHILIP S. STONE.